(12) United States Patent
Martel et al.

(10) Patent No.: US 8,160,156 B2
(45) Date of Patent: Apr. 17, 2012

(54) SYSTEM AND METHOD FOR CONTROLLING THE LONG TERM GENERATION RATE OF COMPRESSED DATA

(75) Inventors: Hugo Martel, Montreal (CA); Alexandre Cottinet, Lasalle (CA); Willie Kouncar, Blainville (CA)

(73) Assignee: Verint Systems, Inc., Laval, Quebec (CA)

( * ) Notice: Subject to any disclaimer, the term of this patent is extended or adjusted under 35 U.S.C. 154(b) by 1769 days.

(21) Appl. No.: 11/345,587

(22) Filed: Feb. 1, 2006

(65) Prior Publication Data

US 2007/0177676 A1    Aug. 2, 2007

(51) Int. Cl.
*H04N 7/12* (2006.01)
*H04N 9/885* (2006.01)
*H04N 7/14* (2006.01)

(52) U.S. Cl. ......... 375/240.26; 375/240.18; 375/240.23; 375/240.25; 386/264; 386/267; 348/14.12; 348/14.13

(58) Field of Classification Search .................. 375/240, 375/240.02–240.03, 240.18, 240.22, 240.23, 375/240.24, 240.25, 240.26, 240.01; 386/224, 386/232, 200, 235–237, 263, 264–268; 348/14.12–14.13; 710/60
See application file for complete search history.

(56) References Cited

U.S. PATENT DOCUMENTS

| | | | |
|---|---|---|---|
| 4,394,774 A | 7/1983 | Widergren et al. | |
| 4,593,324 A * | 6/1986 | Ohkubo et al. | 358/444 |
| 5,231,484 A | 7/1993 | Gonzales et al. | |
| 5,253,078 A | 10/1993 | Balkanski et al. | |
| 5,430,703 A * | 7/1995 | Tsuji et al. | 369/53.18 |
| 5,442,718 A * | 8/1995 | Kobayashi et al. | 382/166 |
| 5,513,375 A * | 4/1996 | Peters | 710/26 |
| 5,563,961 A * | 10/1996 | Rynderman et al. | 382/239 |
| 5,572,331 A * | 11/1996 | Yu | 386/205 |
| 5,621,820 A | 4/1997 | Rynderman et al. | |
| 5,631,644 A | 5/1997 | Katata et al. | |
| 5,724,475 A * | 3/1998 | Kirsten | 386/294 |
| 5,832,125 A * | 11/1998 | Reese et al. | 382/239 |
| 5,872,726 A * | 2/1999 | Sung | 708/313 |
| 6,011,901 A * | 1/2000 | Kirsten | 386/226 |
| 6,065,094 A * | 5/2000 | Akiyama | 711/112 |
| 6,192,075 B1 | 2/2001 | Jeng et al. | |
| 6,212,232 B1 | 4/2001 | Reed et al. | |
| 6,438,166 B2 * | 8/2002 | Kudou | 375/240 |
| 6,526,097 B1 | 2/2003 | Sethuraman et al. | |
| 6,795,506 B1 * | 9/2004 | Zhang et al. | 375/240.26 |
| 7,409,097 B2 * | 8/2008 | Zhang et al. | 382/239 |

(Continued)

FOREIGN PATENT DOCUMENTS

EP    1 124 381 A1    8/2001

(Continued)

*Primary Examiner* — David C. Payne
*Assistant Examiner* — Linda Wong (57) ABSTRACT

The present invention comprises a system and method for controlling the rate a data encoder generates compressed data. The system and method are preferably implemented as program code stored and executed by a processor or computer that is interfaced to standard variable or constant bit rate encoders known in the art. The system preferably encodes and compresses video signals received from a camera, and controls the rate at which the compressed data is generated by the encoder so that storage capacity reserved for the compressed data will not be exceeded. The device preferably takes advantage of periods when the data generation rate is low to increase the quality of video data generated during periods of high activity.

26 Claims, 6 Drawing Sheets

U.S. PATENT DOCUMENTS

| | | | |
|---|---|---|---|
| 2002/0044603 A1* | 4/2002 | Rajagopalan et al. | 375/240.03 |
| 2003/0081672 A1 | 5/2003 | Li | |
| 2003/0202580 A1* | 10/2003 | Noh et al. | 375/240.03 |
| 2005/0058197 A1 | 3/2005 | Lu et al. | |
| 2005/0175099 A1* | 8/2005 | Sarkijarvi et al. | 375/240.16 |
| 2005/0210509 A1 | 9/2005 | Jones | |
| 2005/0254579 A1* | 11/2005 | Kondo | 375/240.03 |
| 2006/0002478 A1* | 1/2006 | Seo | 375/240.24 |
| 2006/0018377 A1* | 1/2006 | Kadono | 375/240.01 |
| 2007/0153914 A1* | 7/2007 | Hannuksela et al. | 375/240.26 |
| 2009/0168891 A1* | 7/2009 | Cheong et al. | 375/240.23 |

FOREIGN PATENT DOCUMENTS

WO  WO-2005/117450 A1  12/2005

* cited by examiner

SYSTEM AND METHOD FOR CONTROLLING THE LONG TERM GENERATION RATE OF COMPRESSED DATA

FIELD OF THE INVENTION

The present invention relates generally to the field of data compression, and more particularly, to an automated system and method for controlling the rate that encoded video data is generated for storage purposes.

BACKGROUND OF THE INVENTION

Compression is the process of removing redundancies in digital data to reduce the amount of data that must be stored or transmitted. There are two types of compression algorithms: lossless and lossy. Lossless compression algorithms remove only enough redundancy so that the original data can be recreated perfectly, without losing any bits. Lossy compression algorithms sacrifice bits in exchange for greater data reduction. Compression algorithms tailored to different types of data, such as audio or video data, encode the data for efficient storage or transmission, and decode the data for access or display. Most compression algorithms are based on one or more encoding methods that also compress a certain type of data. Other encoding methods merely convert data or signals from one format to another, for example, from analog to digital. The term "transcode" is a process of converting data from one encoded format to another, often by decoding/decompressing to a raw format and then re-encoding/compressing into another format. Unless otherwise stated, the term "encode" presumably includes some form of data compression.

The goal of video compression processing is to encode image data to reduce the number of bits used to represent a sequence of video images while maintaining an acceptable level of quality in the decoded video sequence. This goal is particularly important in certain applications, such as video phone or video conferencing over plain old telephone service (POTS) or integrated services digital networks (ISDN) lines, where the existence of limited transmission bandwidth requires careful control over the bit rate. Furthermore, in order to satisfy the transmission in other processing requirements of the video conferencing system, it is often desirable to have a relatively steady flow of bits in the encoding video bit stream. That is, the variation in bit rate from image to image within a video sequence should be kept as low as practicable.

Industry standards from encoding and decoding digitally compressed video signals have been promulgated, for example, the Industry Standards Organization's moving picture experts group (MPEG). These standards are published in for example ISO/IEC 13818-2, (1995E), and ISO/IEC 11172-2 (1993), which are hereby incorporated by reference. Generally speaking, methods and apparatus for compressing digital video data comprise two important classes: either compression algorithms that endeavor to supply a constant bit rate signal, or those which employ adaptive rate control to limit the output data rate (the rate at which compressed data is output) to a fixed value. Examples of conventional digital video compression methods with adaptive rate controls are described in U.S. Pat. Nos. 5,231,484, 5,253,078, and 4,394,774.

Further, the industry has produced several rate control techniques for controlling the bit rate of the video encoder. Examples include the MPEG-2 test model, MPEG-4 verification model, and the H.263 test model. Most of these techniques focus on the problem of two-way communication, e.g., real-time conversational and interactive services. For two-way communications, coding delays are typically in the order of a hundred milliseconds (ms), and consequently, the size of both encoder and the decoder buffer is small. Because the small buffer size cannot tolerate large bit rate fluctuations, these techniques require video encoders that can tightly control the bit rate. Typically, such techniques achieve the desired bit rate by varying the quantizer step size and by dropping frames when the bit level in the encoder buffer threatens to overflow.

At low bit rates, however, the buffer constraint on the encoder often induces unacceptable spacial distortion and temporal resolution, especially in complex regions of the video. Even when the encoder uses the coarsest quantizer step size, it is still difficult to avoid overflowing the encoder buffer without arbitrarily dropping frames. Moreover, such rate control techniques, in general, do not offer a more comprehensive method for controlling the frame rate other than by dropping frames.

Achieving a relatively uniform bit rate can be very difficult especially for video compression algorithms that encode different images within a video sequence using different compression techniques. Depending on the video compression algorithm, images may be designated according to the MPEG standard following different types of frames for compression processing. For example, an intra-frame (I-frame) is encoded using only intra-frame compression techniques. A predicted frame (P-frame) is encoded using inter-frame compression techniques based on a previous I or P-frame and can itself be used as a reference frame to encode one or more other frames.

In a typical transform-based video compression algorithm, a block-based transform, such as a discrete cosine transform (DCT), is applied to blocks of image data corresponding to either pixel values or pixel differences generated, based on a motion-compensated inter-frame differencing scheme. The resulting transform coefficient for each block are quantized for subsequent encoding (e.g. run-length encoding followed by variable-length encoding). The degree to which the transformed coefficients are quantized directly effects both the number of bits used to represent the image data and the quality of the resulting decoded image. This degree of quantization is also referred to as the quantization level, which is often represented by a specified quantizer value that is used to quantize all the transform coefficients. In some video compression algorithms, the quantization level refers to a particular table of quantizer values that are used to quantize different transform coefficients, where each transform coefficient has its own corresponding quanitzer value in the table. In general, higher quantizer values imply more severe quantization and therefore fewer bits in the encoded bit stream at the cost of lower playback quality of decoded images. As such, the quantizer is often used as the primary variable for controlling the trade-off between bit rate and image quality.

One approach to improving digital video quality, as produced according to MPEG-2, is by controlling the video signal processing bit rate. See, e.g., U.S. Pat. No. 5,631,644 entitled "Image Encoding Apparatus." Conventional approaches for bit rate control, however, are relatively complex, typically requiring multiple passes through the data to accomplish digital video encoding. Further, in particular, conventional approaches are designed to generate constant bit rate video signals, which may not be suitable for certain real-time video encoding devices, such as digital video disc (DVD) or camcorder-type video recording appliances.

Regardless of the encoding scheme used to compress video data, there is a need to design a long term data generation rate control algorithm that ensures available memory storage capacity is maximized but not exceeded by the compressed data produced by an encoder.

BRIEF SUMMARY OF THE INVENTION

The present invention comprises a system and method for controlling the rate that compressed data is generated by a data encoder. The system and method are preferably implemented as program code stored and executed by a processor (computer) that is interfaced to standard variable or constant bit rate encoders known in the art. The system preferably encodes and compresses video signals received from a camera, and controls the rate at which the compressed data is generated by the encoder so that storage capacity reserved for the compressed data will not be exceeded. The device preferably takes advantage of periods when the data generation rate is low to increase the quality of video data generated during periods of high activity.

In one aspect, the present invention is directed to a method for controlling an amount of video data generated for storage in a memory over a long-term time period, the method comprising:

measuring an amount of compressed data generated by a video encoder during one or more short-term time periods, each short-term time period being shorter than the long-term time period; and calculating a bit rate setpoint based on a desired storage bit rate for the long-term time period and at least some of the amount measured.

In another aspect of the present invention, the method further comprises controlling the video encoder to compress video data supplied thereto as a function of the bit rate setpoint.

In another aspect of the present invention, the bit rate setpoint is a difference between the desired storage bit rate times a first weighting factor and the measured amount of compressed data times a second weighting factor.

In another aspect of the present invention, each of the short-term time periods has equal length.

In another aspect of the present invention, the first weighting factor is equal to the number of short-term time periods plus one and the second weighting factor is equal to an inverse of a total duration of the one or more short-term time periods.

In another aspect of the present invention, the desired storage bit rate is based on a total allocated data storage capacity of the memory and a duration of the long-term time period.

In another aspect of the present invention, the desired storage bit rate is equal to the total allocated data storage capacity of the memory divided by the duration of the long-term time period.

In another aspect of the present invention, the bit rate setpoint is limited to more than or equal to the desired storage bit rate.

In another aspect of the present invention, the bit rate setpoint is limited to less than or equal to a maximum storage bit rate.

In another aspect of the present invention, the maximum storage bit rate is less than or equal to one and a half times the desired storage bit rate.

In another aspect of the present invention, the maximum storage bit rate is based on a transmission rate limit to the memory.

In another aspect of the present invention, the maximum storage bit rate is based on a constraint of a video reproduction device.

In another aspect, the present invention is directed to a system for storing compressed data, comprising:

an encoder that receives data from a source during a long-term time period, wherein the encoder compresses the data responsive to a bit rate setpoint;

a memory that stores compressed data received from the encoder;

a processor coupled to both the memory and the encoder; and program code stored on a media, that, when executed by the processor, causes the processor to:

measure an amount of the compressed data generated by the encoder during one or more short-term time periods, each short-term time period being shorter than the long-term time period; and calculate the bit rate setpoint based on a desired storage bit rate for the long-term time period and at least some of the amount measured.

In another aspect of the present invention, the program code further causes the processor to control the encoder to compress data supplied thereto as a function of the bit rate setpoint.

In another aspect of the present invention, the bit rate setpoint is a difference between the desired storage bit rate times a first weighting factor and the measured amount of compressed data times a second weighting factor.

In another aspect of the present invention, each of the short-term time periods is equal in length.

In another aspect of the present invention, the first weighting factor is equal to the number of short-term time periods plus one and the second weighting factor is equal to an inverse of a total duration of the one or more short-term time periods.

In another aspect of the present invention, the desired storage bit rate is based on a total allocated data storage capacity in the memory and a duration of the long-term time period.

In another aspect of the present invention, the desired storage bit rate is equal to the total allocated data storage capacity in the memory divided by the duration of the long-term time period.

In another aspect of the present invention, the encoder digitizes and compresses analog video signals from the source.

In another aspect of the present invention, the encoder transcodes digital video encoded by the source.

In another aspect of the present invention, the bit rate setpoint is limited to more than or equal to the desired storage bit rate.

In another aspect of the present invention, the bit rate setpoint is limited to less than or equal to a maximum storage bit rate.

In another aspect of the present invention, the maximum storage bit rate is less than or equal to one and a half times the desired storage bit rate.

In another aspect of the present invention, the maximum bit rate is based on a transmission rate limit to the memory.

In another aspect of the present invention, the maximum bit rate is based on a constraint of a data reproduction device.

In another aspect, the present invention is directed to a method for controlling an amount of video data generated by a video encoder for each of a plurality of successive short-term time periods, where each successive short-term time period is shorter than a long-term time period and the video data generated is stored in a memory, thereby controlling an amount of video data stored in the memory over the long-term time period, the method comprising:

generating a respective bit rate setpoint for each respective short-term time period as a function of a desired bit rate for the long-term time period and the actual amount of data stored during a plurality of prior short-term time periods; and controlling the video encoder during each respective short-term time period to encode video data supplied thereto as a function of the bit rate setpoint for that short-term time period.

In another aspect, the present invention is directed to a method for controlling an amount of video data generated by a video encoder over a long-term time period, the method comprising:

generating a bit rate setpoint for a short-term time period, smaller than the long-term time period, as a function of a desired bit rate for the long-term time period and an actual amount of data stored during a prior time period; and controlling the video encoder during the short-term time period to encode video data supplied thereto as a function of the bit rate setpoint.

DETAILED DESCRIPTION OF THE INVENTION

The present invention comprises a system and method for controlling the rate that compressed data is generated by a data encoder. The system and method are preferably implemented as program code stored and executed by a processor (computer) that is interfaced to standard variable or constant bit rate encoders known in the art. The system preferably encodes and compresses video signals received from a camera, and controls the rate at which the compressed data is generated by the encoder so that storage capacity reserved for the compressed data will not be exceeded. The device preferably takes advantage of periods when the data generation rate is low to increase the quality of video data generated during periods of high activity.

Additionally, the present invention may be described herein in terms of functional block components, code listings, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices.

Similarly, the software elements of the present invention may be implemented with any programming or scripting language such as C, C++, C#, Java, COBOL, assembler, PERL, or the like, with the various algorithms being implemented with any combination of data structures, objects, processes, routines or other programming elements. The computer code is preferably programmed in C.

Further, it should be noted that the present invention may employ any number of conventional techniques for data transmission, signaling, data processing, network control, and the like.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical or virtual couplings between the various elements. It should be noted that many alternative or additional functional relationships or physical or virtual connections may be present in a practical electronic data communications system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The scope of the invention should be determined by the appended claims and their legal equivalents, rather than by the examples given herein. For example, the steps recited in any method claims may be executed in any order and are not limited to the order presented in the claims. Moreover, no element is essential to the practice of the invention unless specifically described herein as "critical" or "essential."

System Architecture

Figure 1:
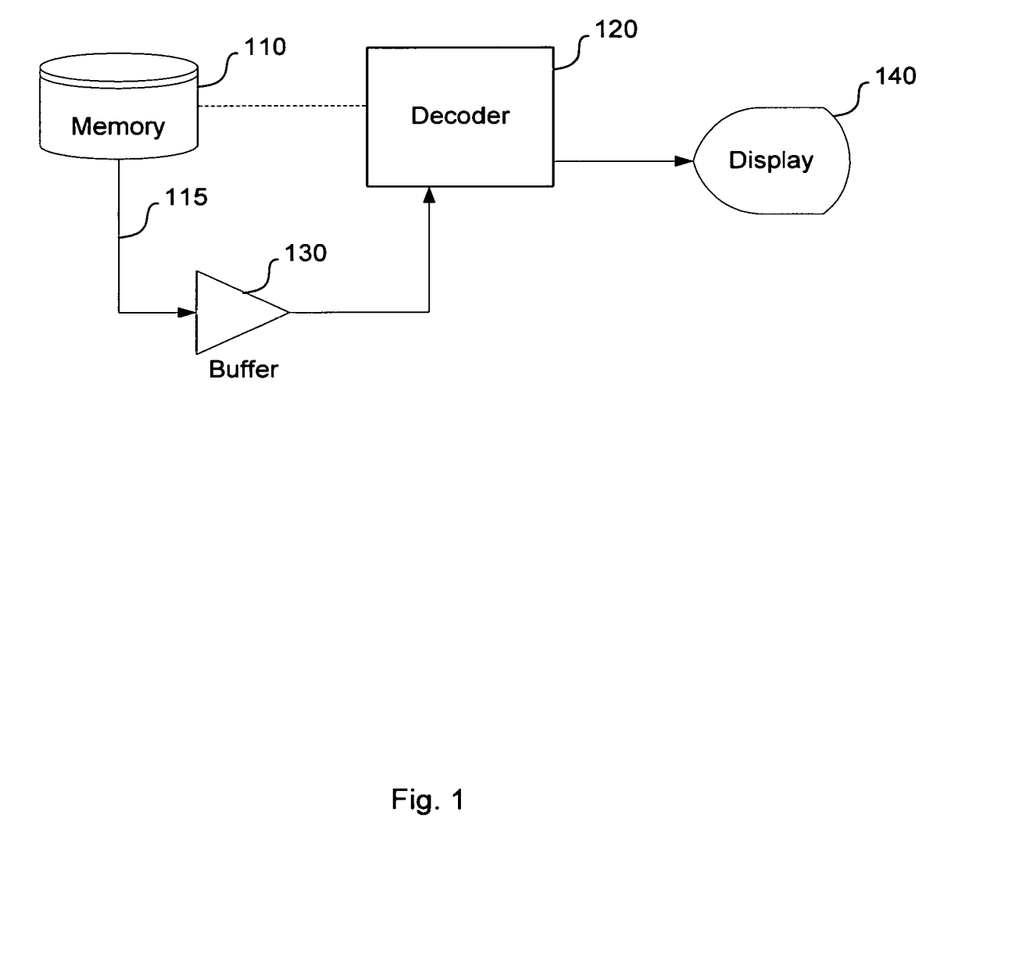
FIG. 1 is a block diagram illustrating a video decoder of the prior art.

FIG. 1 illustrates a typical video reproduction system known in the prior art. As shown in FIG. 1, the system 100 comprises a video data storage memory 110, a decoder 120, a buffer 130 and a display to render the video thereon 140. A transmission channel or network connection 115 couples the memory 110 to decoder buffer 130. This channel can be wired or wireless for example, the memory can be in a server computer and the decoder 120 in a client computer, where the client and server are coupled together to each other across a network via the transmission channel. In an alternative embodiment, shown by dashed lines, memory 110 can be locally coupled to the video decoder 120 without the intervening decoder buffer 130.

Where the memory 110 is remote from the decoder 120, the decoder buffer 130 is coupled to receive the bit stream from memory 110 via the transmission channel. Because one way communication video delivery applications can tolerate a sizable initial coding delay, the decoder buffer 130 can have a large bit capacity that allows the bit rate of the bit stream to fluctuate without causing an overflow or underflow. This large bit capacity enables decoder buffer 130 to absorb any large bit rate fluctuations in the compressed video data. Because buffer 130 can absorb such fluctuations, a video encoder can become free to allocate more bits to a particular video frame, thereby increasing the bit rate of the data generated in order to achieve a more constant and higher perceived visual quality. However, a smaller buffer 130 would provide a constraint on the ultimate data generation rate provided by a video encoder.

The video decoder 120 is coupled to obtain the compressed video data from the buffer 130 and to transmit decoded video data to display 140. Preferably, the video decoder 120 is compliant with any of the standard decoder defined by MPEG-1, MPEG-2, H.261, H.263 and MPEG-4, depending on the actual standard being implemented. Display device 140 can be any cathode ray tube (CRT) device such as any television screen or computer monitor.

In operation, when the viewer so requests, the compressed bit stream is obtained, decoded, and displayed. In the embodiment where memory 110 is remote from the decoder buffer 130, the compressed video is transmitted across transmission channel 115 to decoder buffer 130. The channel operates at a fixed (i.e., constant) channel transmission rate $R_C$ in bits per second (b/s). Depending on the motive transmission, the fixed bit rate can be relatively low (i.e., less than 1 Mb/s).

For example, the channel can be a public switched telephone network that transfer this data a 28.8 Kb/s to accommodate the modems provided at the ends of the channel. Because this bandwidth is portion to video, audio and overhead data, the transfer of the video data can use just a portion of the bandwidth (e.g., only 20 Kb/s of available 28.8 Kb/s). Consequently, the bandwidth available for transmitting video data constrains a video encoder to produce a bit stream at that low bit rate so the decoder buffer 130 will not overflow or underflow when the video data is decoded.

The video decoder 120 obtains the compressed video data from the decoder buffer 130 at a variable video rate, decompresses the video data, and sends the decompressed video data to the display device 140 for display. The rate of decoding is approximately the rate at which an encoder produced the bit stream. Before starting to decode the compressed video data, the video decoder 120 waits until decoder buffer 130 reaches a particular bit level. Because of the non-real time nature of typical one-way communication video delivery applications, the delay of a few seconds for example in the display of a video sequence may be acceptable. The purpose of rate control at encode at an encoder is to ensure that the transmission of compressed video data at the channel rate does not overflow or underflow the decoder buffer 130. Where the bit level would overflow the capacity of decoder buffer 130 because the bandwidth of the transmission channel exceeds that of the decoding and display rate, the decoder 120 can simply notify the transmission protocol to temporarily suspend transmission.

Where the video decoding rate exceeds the bandwidth of the transmission channel, the bit level of the decoder buffer 130 would underflow because the video decoder 120 would exhaust the decoder buffer 130 of video data it would have to stop to pre-buffer the bit stream again. Other result, the display cannot be refreshed and the video sequence freezes during this time interval. In the prior art, a clear objective of rate control is to prevent the bit level in the decoder buffer 130 from dropping to zero. Thus, the rate at which the decoder 120 consumes video data from the buffer 130 should not exceed the rate at which the buffer 130 receives compressed video data from memory 110. Accordingly, a video encoder system must target the transmission rate of the encoder to the expected channel transmission rate.

Figure 2:
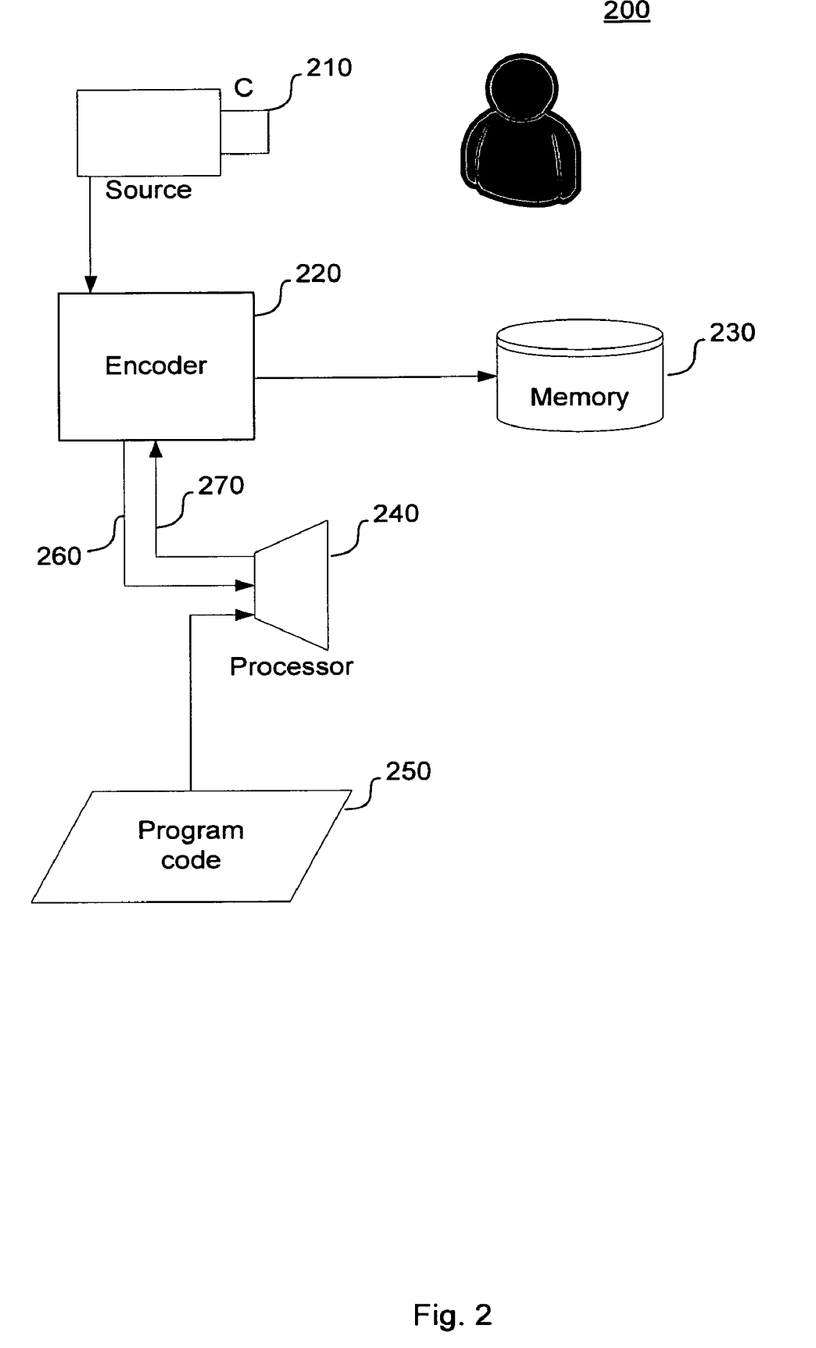
FIG. 2 is a block diagram that illustrates a computer system that controls a rate that compressed data is generated by a video encoder.

FIG. 2 is a block diagram that illustrates a computer system that controls a rate of compressed data generated by a video encoder. As shown in FIG. 2 system 200 comprises a source of video signals 210, and encoder 220, a memory 230 and a processor 240 that executes program code 250 and receives and sends signals 260 and 270 to and from encoder 220. Data source 210 is preferably a digital video camera that provides raw video output to encoder 220. Alternately, source 210 can be an analog video camera output signals that are digitized by encoder 220. More generally, source 210 can be any stream of data that is digitized and subsequently compressed by encoder 220.

Video encoder 220 is preferably a standard codec that employs standard algorithms known in the art such as MPEG-4, JPEG, H.264, MPEG-2, wavelet, etc., wherein an input data stream is compressed/encoded and output to memory 230. Typically, encoder 220 comprises an input signal 270 which determines the level of quantization of the incoming data stream. However, properties of the incoming data stream are determinative of the output bit rate from encoder 220. The present invention takes advantage of those encoders known in the art by measuring the amount of data generated by the encoder from the data stream provided to it. The invention utilizes periods where there is less activity in the data stream such that the encoder can readily compress such data stream in an efficient manner and consume less storage.

In a preferred embodiment, processor 240 supplies a bit rate setpoint signal 270 to encoder 220 to affect its operation. As is well known in the art of variable bit rate encoding devices, such a signal can be used to determine the output bit rate of the encoder. In an alternative preferred embodiment, the encoder is of the constant bit rate variety, but the output bit rate can be adjusted by the bit rate setpoint signal 270. Despite which type of encoder is employed, the bit rate setpoint signal 270 is supplied to it to control the approximate rate of compressed data generation. The invention seeks to maximize quality and storage space over a measurement period of time. To be effective, the invention preferably measures the amount of data generated during individual short term data measurement periods. Preferably, each short term time period is one hour. Such time span is used to take advantage of the diurnal variation in raw video signal input supplied to encoder 220.

Processor 240 loads program code 250 and executes this code in order to perform its functions. Processor 240 also receives feedback from encoder 220 via signals 260. Such feedback includes the amount of data generated during a current measurement period.

Figure 3:
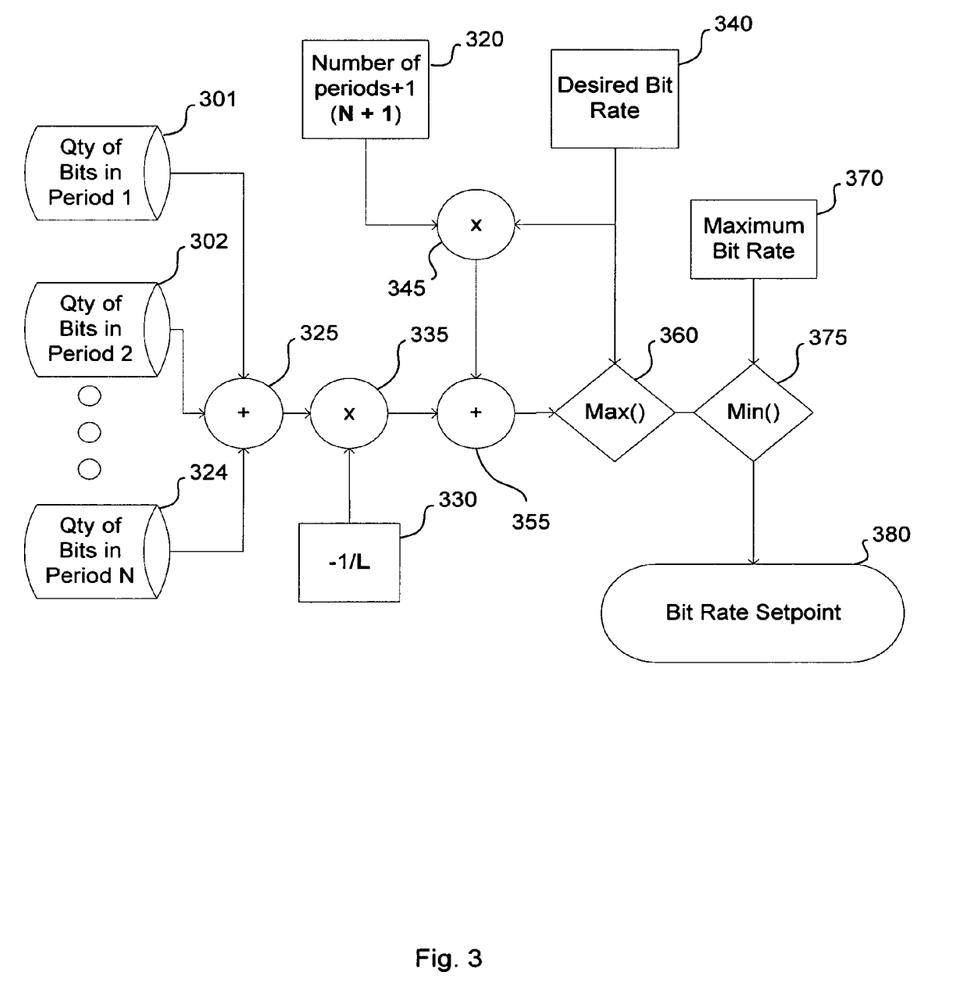
FIG. 3 is a block diagram that illustrates a preferred embodiment for determining a bit rate setpoint.

FIG. 3 is a block diagram that illustrates a preferred embodiment for determining a bit rate setpoint. The algorithm depicted in FIG. 3 is preferably implemented in program code 250. In an alternate embodiment, the algorithm may be implemented in hardware which controls encoder 220, or processor 240 and the associated algorithm may be embedded within a hardware encoder 220.

With reference to FIG. 3, registers 301, 302 through 324 retain the amount of compressed data generated in twenty-four consecutive one-hour time periods by encoder 220. These quantities are summed at element 325 to create the total amount of data encoded over the course of the last twenty-four measured periods. Alternatively, the amount of compressed data generated in selected time periods can be included in the total, instead of the total amount of compressed data generated in every period. A negative weighting factor 330 is applied to the total quantity of encoded data. Preferably, weighting factor 330 is the inverse of the total duration of the consecutive time periods, e.g., twenty-four, 1 hour periods, or 24 hours, times negative one. The product 335 is combined with a weighted desired bit rate 345. The weighted desired bit rate is obtained by taking a number of periods plus one 320 and multiplying it by a desired bit rate 340. The combined difference 355 is calculated and is limited 360 to at least the desired bit rate 340. The maximum of the desired bit rate and the combined difference 360 is compared to a maximum bit rate 370. The minimum of these two rates 375 is used as the bit rate setpoint 380.

System Operation

The following discussion describes the methods performed by the inventive system. To provide context, the operation of an exemplary, preferred embodiment of program code 250 is described.

Figure 4:
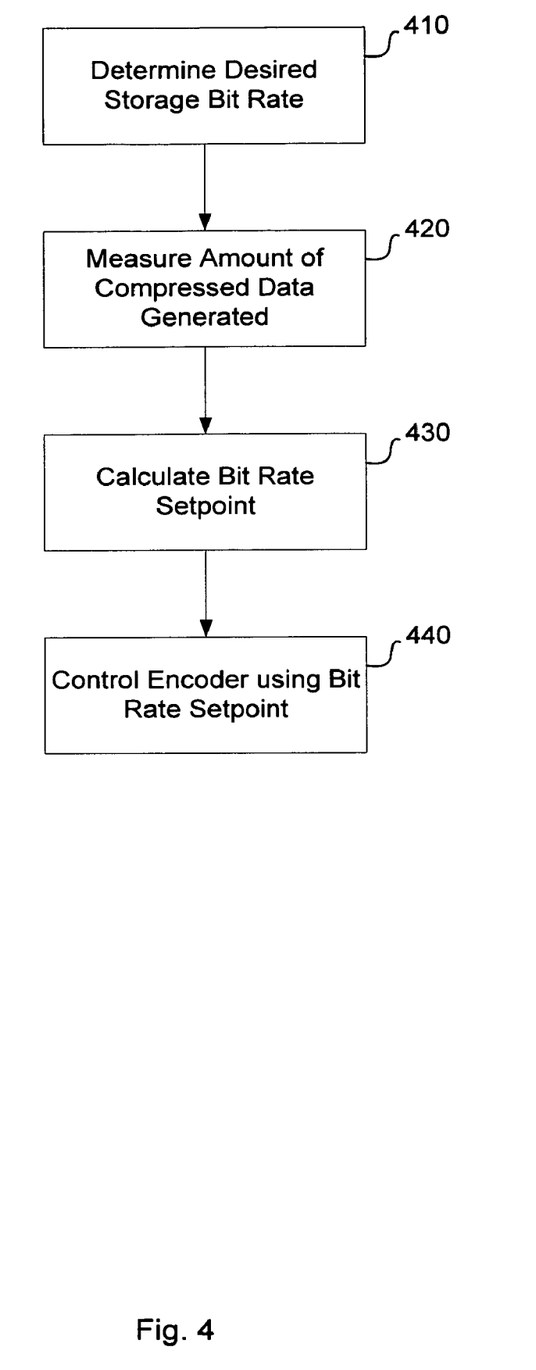
FIG. 4 is a flow chart illustrating a method of controlling a rate of data generation of an encoder.

FIG. 4 illustrates an inventive method implemented on system 200 running the program code 250. As shown in FIG. 4, in step 410, a desired storage bit rate is determined. In a preferred embodiment, the desired storage bit rate is based on a total storage capacity of memory 230 and a duration of a long term time period. More particularly, if the total allocated data storage capacity of the memory is divided by the duration of a long term time period, the quotient would reflect the desired storage bit rate for the memory 230. For example, suppose that the total amount of storage capacity allocated for storing video data is 27 GB and the duration of the long term time period could be 30 days. The resultant desired storage bit rate would be 10.5 kbytes/sec. The maximum storage bit rate is preferably set at one and a half times the desired storage bit rate. Alternatively, the maximum storage bit rate is based on a transmission rate limit to the memory. In yet another preferred embodiment, the maximum storage bit rate is based on a constraint of a video reproduction device. As explained above, video reproduction devices having buffers may be limited by the maximum bit rate which they can reproduce compressed video data, and the maximum storage bit rate could be based on such rate (i.e., must be less than or equal to such maximum rate).

In step 420 the amount of compressed data generated by encoder 220 is measured over the course of a series of short term time periods. During each short term time period that the compressed data is generated by encoder 220, the amount of data generated is measured.

In step 430 the bit rate setpoint is calculated. The bit rate setpoint provides the encoder with a target bit rate used to encode the incoming video data stream.

Finally, in step 440, the bit rate setpoint is provided to encoder 220 to control the encoding process. As explained above, the encoder will adjust the quantization and frame rate parameters in order to produce a compressed data stream having a bit rate as close to the target bit rate parameter provided as possible.

Figure 5:
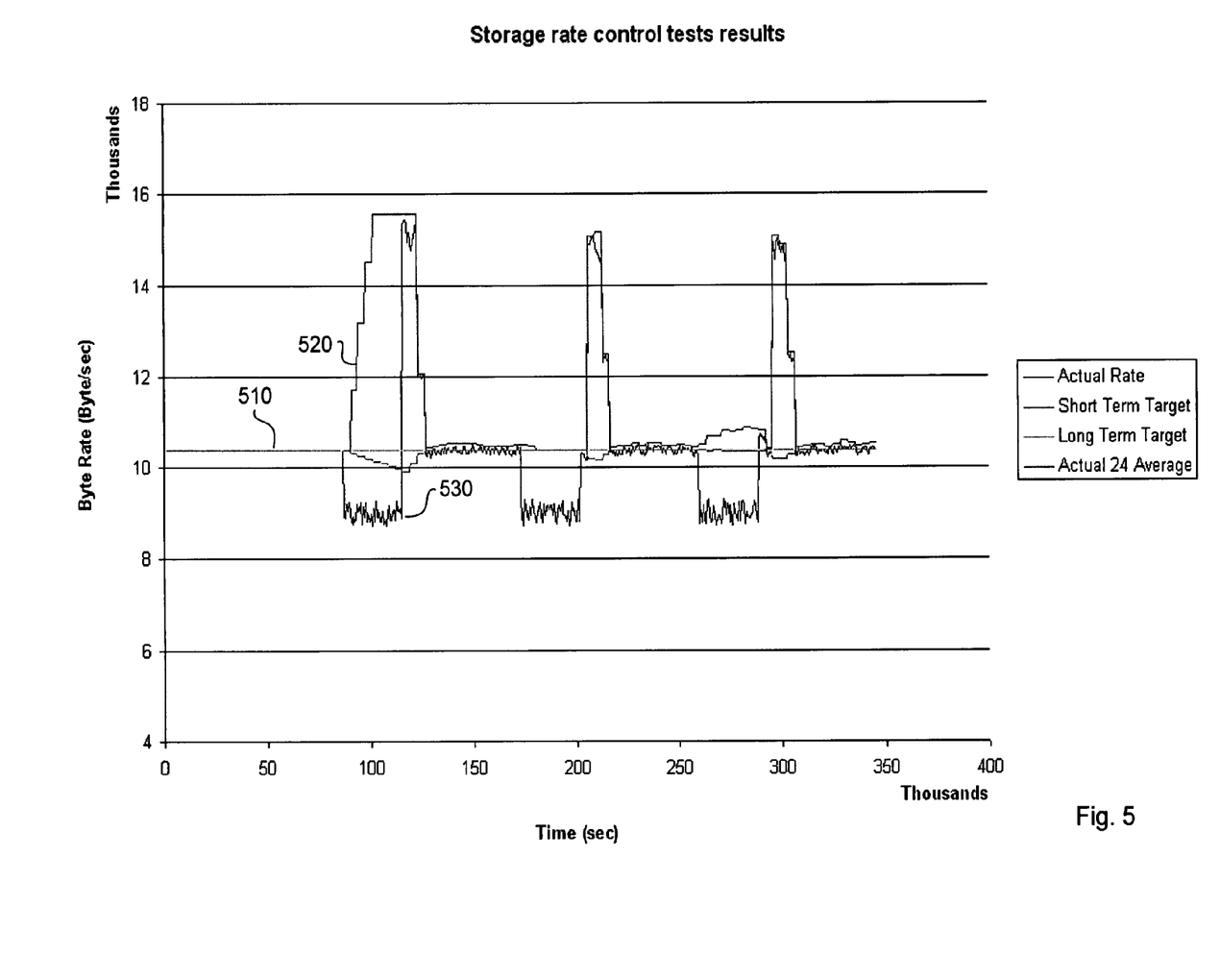
FIG. 5 is a chart that illustrates test results of the preferred embodiment.

FIG. 5 is a graph that illustrates test results of the preferred embodiment. As shown in FIG. 5, a desired storage bit rate 510 is supplied to encoder 220. The bit rate setpoint 520 varies based on the amount of data generated by the encoder 220. As shown in the graph, around the 88,000 second time mark, the activity of compressed video data 530 decreases significantly. Over the course of the next several short term time periods, the bit rate setpoint 520 is adjusted upward to take advantage of the recent periods of relatively low compressed data generation rate. Eventually, around the 115,000 second mark, encoder 220 encounters a high activity input video data stream, and the compressed data generation rate 530 increases to nearly achieve the bit rate setpoint 520. In this period of high activity in the recorded video data stream, the quality of the encoded video data is thereby improved. Eventually, in subsequent short term time periods, the bit rate setpoint 520 is reduced so that the amount of compressed data generated does not overshoot the storage capacity of memory 230. Finally, as noted on the graph, the bit rate setpoint 520 is returned to a level near the desired storage bit rate around the 127,000 second mark. In this fashion, system 200 can provide high quality compressed video data during periods of high video activity without exceeding storage capacity of memory 230.

Software on Media

Figure 6:
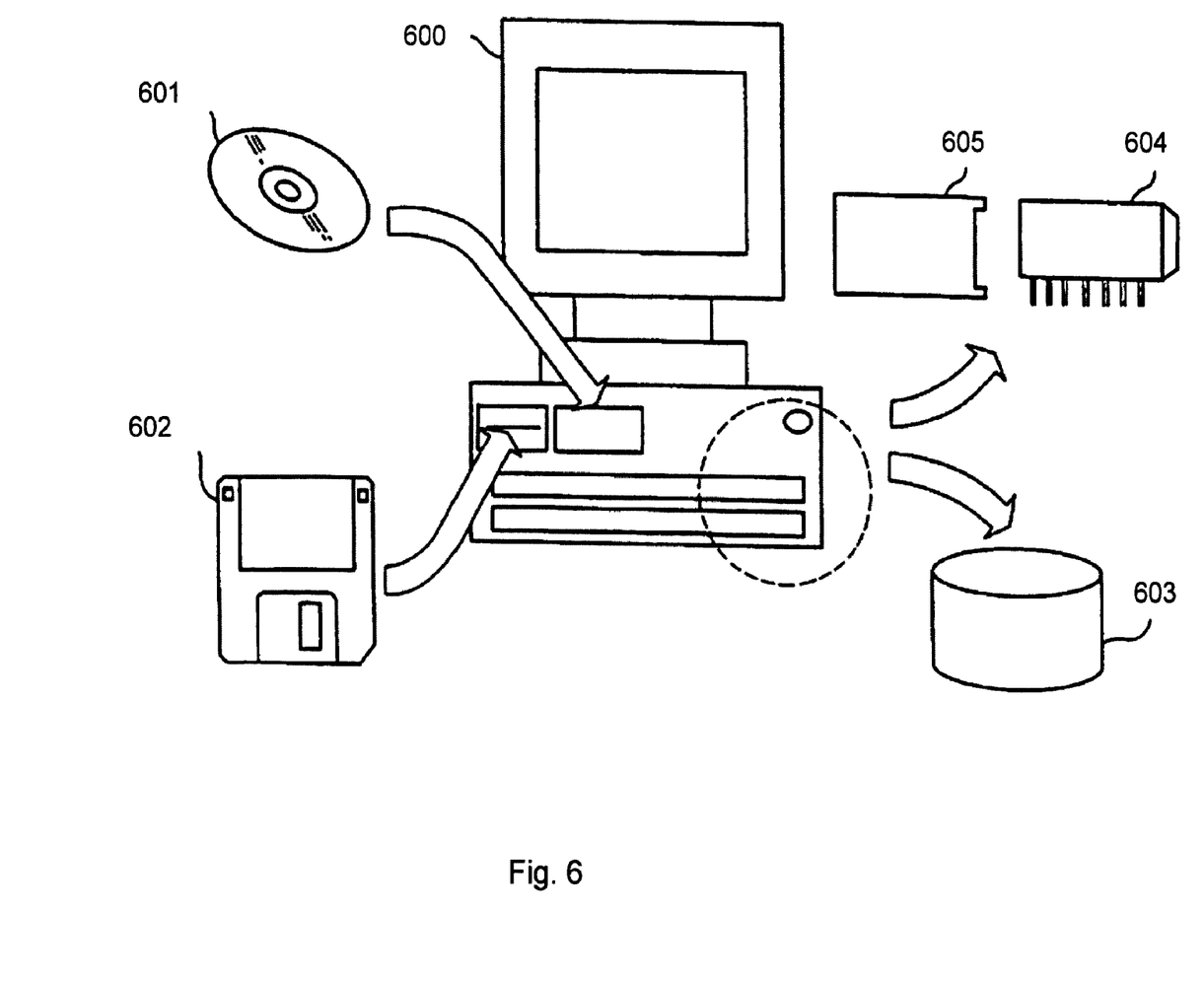
FIG. 6 illustrates examples of recording media.

In the specification, the term "media" means any medium that can record data therein. FIG. 6 illustrates examples of recording media.

The term "media" includes, for instance, a disk shaped media for 601 such as CD-ROM (compact disc-read only memory), magneto optical disc or MO, digital video disc-read only memory or DVD-ROM, digital video disc-random access memory or DVD-RAM, a floppy disc 602, a memory chip 604 such as random access memory or RAM, read only memory or ROM, erasable programmable read only memory or E-PROM, electrical erasable programmable read only memory or EE-PROM, a rewriteable card-type read only memory 605 such as a smart card, a magnetic tape, a hard disc 603, and any other suitable means for storing a program therein.

A recording media storing a program for accomplishing the above mentioned apparatus maybe accomplished by programming functions of the above mentioned apparatuses with a programming language readable by a computer 600 or processor, and recording the program on a media such as mentioned above.

A server equipped with a hard disk drive may be employed as a recording media. It is also possible to accomplish the present invention by storing the above mentioned computer program on such a hard disk in a server and reading the computer program by other computers through a network.

As a computer processing device 600, any suitable device for performing computations in accordance with a computer program may be used. Examples of such devices include a personal computer, a laptop computer, a microprocessor, a programmable logic device, or an application specific integrated circuit.

Having thus described at least illustrative embodiments of the invention, various modifications and improvements will readily occur to those skilled in the art and are intended to be within the scope of the invention. For example, the methods and structure presented can be applied to any data compression technology besides video data compression, such as compression of audio data streams or database record transactions. Accordingly, the foregoing description is by way of example only and is not intended as limiting. The invention is limited only as defined in the following claims and the equivalents thereto.

What is claimed is:

1. A method for controlling an amount of video data generated for storage in a memory over a long-term time period, the method comprising:
measuring an amount of compressed data generated by a video encoder during one or more short-term time periods, each short-term time period being shorter than the long-term time period; and
calculating a bit rate setpoint based on a desired storage bit rate for the long-term time period and at least some of the amount measured;
wherein the bit rate setpoint is a difference between the desired storage bit rate times a first weighting factor and the measured amount of compressed data times a second weighting factor.

2. The method of claim 1, further comprising controlling the video encoder to compress video data supplied thereto as a function of the bit rate setpoint.

3. The method of claim 2, wherein the bit rate setpoint is limited to more than or equal to the desired storage bit rate.

4. The method of claim 3, wherein the bit rate setpoint is limited to less than or equal to a maximum storage bit rate.

5. The method of claim 4, wherein the maximum storage bit rate is less than or equal to one and a half times the desired storage bit rate.

6. The method of claim 4, wherein the maximum storage bit rate is based on a transmission rate limit to the memory.

7. The method of claim 4, wherein the maximum storage bit rate is based on a constraint of a video reproduction device.

8. The method of claim 1, wherein each of the short-term time periods has equal length.

9. The method of claim 8, wherein the first weighting factor is equal to the number of short-term time periods plus one and the second weighting factor is equal to an inverse of a total duration of the one or more short-term time periods.

10. The method of claim 1, wherein the desired storage bit rate is based on a total allocated data storage capacity of the memory and a duration of the long-term time period.

11. A method for controlling an amount of video data generated for storage in a memory over a long-term time period, the method comprising:
measuring an amount of compressed data generated by a video encoder during one or more short-term time periods, each short-term time period being shorter than the long-term time period; and
calculating a bit rate setpoint based on a desired storage bit rate for the long-term time period and at least some of the amount measured;
wherein the desired storage bit rate is equal to the total allocated data storage capacity of the memory divided by the duration of the long-term time period.

12. A system for storing compressed data, comprising:
an encoder that receives data from a source during a long-term time period, wherein the encoder compresses the data responsive to a bit rate setpoint;
a memory that stores compressed data received from the encoder;
a processor coupled to both the memory and the encoder; and
program code stored on a media, that, when executed by the processor, causes the processor to:
measure an amount of the compressed data generated by the encoder during one or more short-term time periods, each short-term time period being shorter than the long-term time period; and
calculate the bit rate setpoint based on a desired storage bit rate for the long-term time period and at least some of the amount measured;
wherein the bit rate setpoint is a difference between the desired storage bit rate times a first weighting factor and the measured amount of compressed data times a second weighting factor.

13. The system of claim 12, wherein the program code further causes the processor to control the encoder to compress data supplied thereto as a function of the bit rate setpoint.

14. The system of claim 13, wherein the bit rate setpoint is limited to more than or equal to the desired storage bit rate.

15. The system of claim 14, wherein the bit rate setpoint is limited to less than or equal to a maximum storage bit rate.

16. The system of claim 15, wherein the maximum storage bit rate is less than or equal to one and a half times the desired storage bit rate.

17. The system of claim 15, wherein the maximum bit rate is based on a transmission rate limit to the memory.

18. The system of claim 15, wherein the maximum bit rate is based on a constraint of a data reproduction device.

19. The system of claim 12, wherein each of the short-term time periods is equal in length.

20. The system of claim 19, wherein the first weighting factor is equal to the number of short-term time periods plus one and the second weighting factor is equal to an inverse of a total duration of the one or more short-term time periods.

21. The system of claim 12, wherein the desired storage bit rate is based on a total allocated data storage capacity in the memory and a duration of the long-term time period.

22. The system of claim 12, wherein the encoder digitizes and compresses analog video signals from the source.

23. The system of claim 12, wherein the encoder transcodes digital video encoded by the source.

24. A system for storing compressed data, comprising:
 an encoder that receives data from a source during a long-term time period, wherein the encoder compresses the data responsive to a bit rate setpoint;
 a memory that stores compressed data received from the encoder;
 a processor coupled to both the memory and the encoder; and
 program code stored on a media, that, when executed by the processor, causes the processor to:
  measure an amount of the compressed data generated by the encoder during one or more short-term time periods, each short-term time period being shorter than the long-term time period; and
  calculate the bit rate setpoint based on a desired storage bit rate for the long-term time period and at least some of the amount measured;
 wherein the desired storage bit rate is equal to the total allocated data storage capacity in the memory divided by the duration of the long-term time period.

25. A method for controlling an amount of video data generated by a video encoder for each of a plurality of successive short-term time periods, where each successive short-term time period is shorter than a long-term time period and the video data generated is stored in a memory, thereby controlling an amount of video data stored in the memory over the long-term time period, the method comprising:
 measuring an amount of compressed data generated by the video encoder during one or more short-term time periods;
 generating a respective bit rate setpoint for each respective short-term time period as a function of a desired bit rate for the long-term time period and the actual amount of data stored during a plurality of prior short-term time periods; and
 controlling the video encoder during each respective short-term time period to encode video data supplied thereto as a function of the bit rate setpoint for that short-term time period;
 wherein the bit rate setpoint is a difference between the desired bit rate times a first weighting factor and the measured amount of compressed data times a second weighting factor.

26. A method for controlling an amount of video data generated by a video encoder over a long-term time period, the method comprising:
 measuring an amount of compressed data generated by the video encoder during a short-term time period, smaller than the long-term time period;
 generating a bit rate setpoint for the short-term time period as a function of a desired bit rate for the long-term time period and an actual amount of data stored during a prior time period; and
 controlling the video encoder during the short-term time period to encode video data supplied thereto as a function of the bit rate setpoint;
 wherein the bit rate setpoint is a difference between the desired bit rate times a first weighting factor and the measured amount of compressed data times a second weighting factor.

\* \* \* \* \*